United States Patent [19]

Baloche et al.

[11] Patent Number: 5,717,300
[45] Date of Patent: Feb. 10, 1998

[54] DEVICE FOR LONGITUDINAL POSITIONING OF A VEHICLE SEAT

[75] Inventors: François Baloche, La Carneille; Marc Taylor, Avranches, both of France

[73] Assignee: Bertrand Faure France, France

[21] Appl. No.: 393,737

[22] Filed: Feb. 24, 1995

[30] Foreign Application Priority Data

Feb. 25, 1994 [FR] France ................................. 94 02210

[51] Int. Cl.⁶ ...................................................... H02P 1/00
[52] U.S. Cl. ........................... 318/282; 318/446; 318/466; 297/341
[58] Field of Search ................................. 297/330–336, 297/340–344.17; 318/280, 286, 446, 466, 468

[56] References Cited

U.S. PATENT DOCUMENTS

| | | | |
|---|---|---|---|
| 3,811,726 | 5/1974 | Muraishi et al. | 297/341 |
| 4,015,877 | 4/1977 | Button | 297/341 |
| 4,043,593 | 8/1977 | Turner | 297/341 |
| 4,434,468 | 2/1984 | Caddick et al. | 318/466 |
| 4,467,252 | 8/1984 | Takeda et al. | |
| 4,547,718 | 10/1985 | Ratzel et al. | 318/568 |
| 4,832,403 | 5/1989 | Tomita | 297/341 |
| 5,004,967 | 4/1991 | Ogasawara | 318/466 |

FOREIGN PATENT DOCUMENTS

| | | |
|---|---|---|
| 2 263 122 | 10/1975 | France . |
| 2 322 763 | 4/1977 | France . |
| 2 391 873 | 12/1978 | France . |
| 2 513 195 | 3/1983 | France . |
| 2 233 915 | 1/1973 | Germany . |

*Primary Examiner*—David S. Martin
*Attorney, Agent, or Firm*—Larson and Taylor

[57] ABSTRACT

The invention relates to a system for longitudinal positioning of a vehicle seat, including an electrical automatic device for displacing the seat part of the seat forwards when the backrest of the seat is folded down, and backwards as far as a previously set position when the backrest is brought upright again. The automatic device includes a slider which can move longitudinally, a sensor for detecting a position known as the locking position of the slider relative to the seat part, a lock for securing the slider and the seat part in this position, a circuit-breaker for stopping the action of the automatic device in the event where the latter is displacing the seat part backwards and where the locking position is detected, the lock and the circuit-breaker being neutralized when the backrest is folded down.

6 Claims, 3 Drawing Sheets

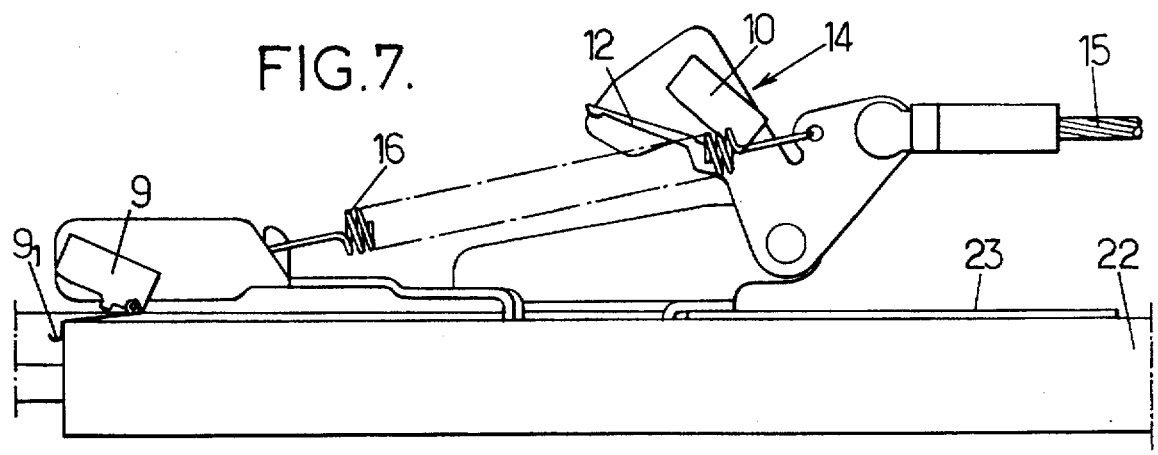
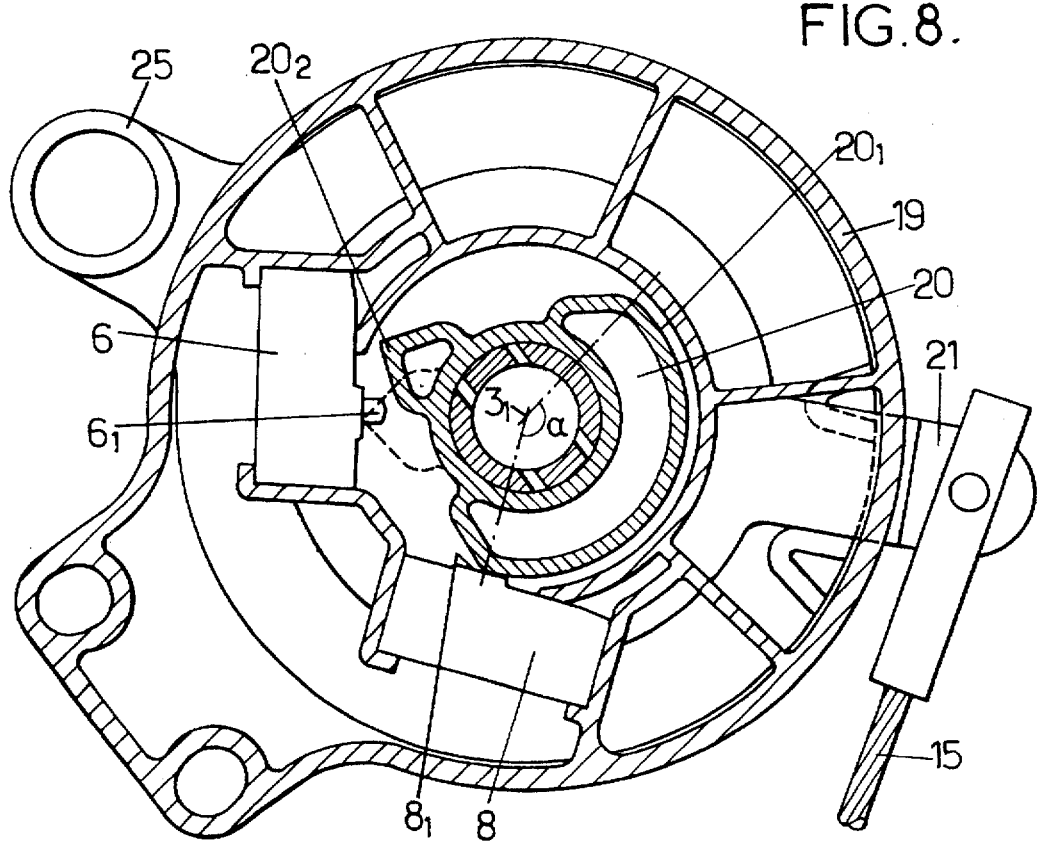

DEVICE FOR LONGITUDINAL POSITIONING OF A VEHICLE SEAT

FIELD OF THE INVENTION

The present invention relates to a device for longitudinal positioning of a vehicle seat.

More particularly, the invention relates to such a device intended for a seat including a seat part which is mounted so that it can move in terms of translation forwards and backwards in a direction known as a longitudinal direction, and a backrest mounted on the seat part and able to pivot between a folded-down forwards position and an upright position in which a user can sit down on the seat, which corresponds to the driving position for the driver.

BACKGROUND OF THE INVENTION

When it is desired to gain access to some part of the vehicle situated behind the backrest of the seat, and especially in the case of a front seat of a two- or three-door vehicle, it may be particularly useful, in addition to folding down the backrest, to move the seat part of the seat forwards in order to free up as far as possible the said part of the vehicle situated behind the backrest of the seat.

To this end, document FR-A-2,513,195 proposes a positioning device of the type denoted hereinabove, including:

adjusting means for longitudinally displacing the seat part in terms of translation as far as a chosen position, thus achieving adjustment called "comfort adjustment", and automatic-displacement means for automatically displacing the seat part forwards as far as a position known as the end-of-travel position when the backrest is folded down and for automatically displacing the seat part backwards as far as the abovementioned chosen position when the backrest is brought back from its folded-down position to its upright position.

However, in order to return the seat part of the seat automatically backwards as far as the chosen position, that is to say the position which has been set beforehand, the device disclosed in document FR-A-2,513,195 envisages electronic means which are complicated and expensive.

SUMMARY OF THE INVENTION

The object of the present invention is especially to propose a device of the type defined hereinabove, which implements simple, reliable and inexpensive means.

To this end, according to the invention, a device for longitudinal positioning of a vehicle seat of the type defined hereinabove is essentially characterized in that the automatic-displacement means include a slider which can move longitudinally in terms of translation, detection means for detecting a predetermined relative position, known as the locking position, of the slider relative to the seat part, locking means for securing the slider relative to the seat part when the slider and the seat part are in their relative locking position, stopping means for stopping the action of the automatic displacement means in the case where these are displacing the seat part backwards and where the locking position is detected by the detection means, and neutralizing means for neutralizing both the action of the locking means and of the stopping means when the backrest is in its folded-down position.

Thus, the slider makes it possible to memorize the chosen position of the seat part of the seat, that is to say the position set beforehand, in an extremely simple way.

In preferred embodiments of the invention, recourse is further had to one and/or other of the following provisions:

the locking means include a limit stop which is secured to the seat part and a locking member which is mounted so that it can pivot on the seat part between an engagement position and a non-obstructing position, this locking member being urged by a spring towards its engagement position and being capable of being displaced into its non-obstructing position by the neutralizing means when the backrest is placed in its folded-down position, the said locking member including a stopping face pointing forwards, the slider being trapped between the limit stop and the said stopping face when the said slider and the seat part are in their relative locking position, the slider and the locking member respectively including surfaces designed to interact with each other in order to displace the locking member towards its non-obstructing position, through a cam effect, without displacing the slider, when the seat part is being displaced automatically backwards, so that the seat part can come back into the locking position relative to the slider;

the slider can move with sufficient friction to prevent the said slider from being displaced during the abovementioned cam effect;

the neutralizing means include a cable which is mounted between the locking member and the backrest of the seat, and which is tensioned when the backrest is in its folded-down position, in order to cause the locking member to pivot into its non-obstructing position;

the automatic-displacement means include an automatic-displacement electric motor, and the stopping means consist of a stop switch which is mounted in series with this electric motor, the detection means including a detection lever which operates the stop switch and which is mounted so as to pivot on the locking member, it being possible for this detection lever to be displaced between a position of rest in which the stop switch allows the automatic-displacement electric motor to be powered and a detection position in which the said stop switch cuts off the power supply of the said automatic-displacement electric motor, the detection lever being urged elastically towards its position of rest, it being possible for the detection lever to be displaced into its detection position by the slider when the slider and the seat part are in their relative locking position and the locking member is in its engaged position, and the detection lever no longer being in contact with the slider when the locking member is in its non-obstructing position, so that the said detection lever is then in its position of rest;

the automatic-displacement means include a folded-down-position switch and an upright-position switch, the automatic-displacement electric motor and the stop switch being connected in series between the folded-down-position switch and the upright-position switch, and the said folded-down-position and upright-position switches interacting with the backrest of the seat in order to connect the automatic-displacement electric motor to electrical power supply means, reversing the direction of rotation of the said motor depending on whether the backrest is in its folded-down position or in its upright position;

the upright-position switch is linked directly to a terminal of the electrical power supply means when the backrest is in the upright position, and the said upright-position switch is linked to another terminal of the electrical power supply means by means of an end-of-travel switch when the backrest is in the folded-down position, this end-of-travel switch being open when the seat part of the seat is forwards in its end-of-travel position, and closed when the seat part of the seat is not in the said end-of-travel position;

the backrest of the seat is mounted so as to rotate about a rotation spindle, the device including a rotary cam which is secured to the backrest and which has a circular arc-shaped profile centred on the said rotation spindle and extending over a certain angle, the upright-position switch including an operating member which is displaced elastically by the cam member when the backrest is in its upright position, and which then finds itself in contact with the circular arc-shaped profile of this cam member, the angle over which the circular arc-shaped profile extends being sufficient to allow a certain range for angular adjustment of the upright position of the backrest and for the member for operating the upright-position switch to be in contact with the said circular arc-shaped profile in the upright position of the backrest throughout this adjustment range.

Other characteristics and advantages of the invention will emerge during the following detailed description of one of its embodiments, given by way of non-limiting example, with regard to the appended drawings.

BRIEF DESCRIPTION OF THE DRAWINGS

In the drawings:

FIG. 7 is a view similar to FIG. 4 but not sectioned, when the backrest is in its folded-down position and the seat part is shifted forwards as far as its end-of-travel position, and FIG. 8 is a section which represents the seat backrest position switches and the cam member which operates them, in the embodiment of FIG. 2.

DESCRIPTION OF THE PREFERRED EMBODIMENTS

In the various figures, the same references denote identical elements.

Figure 1:
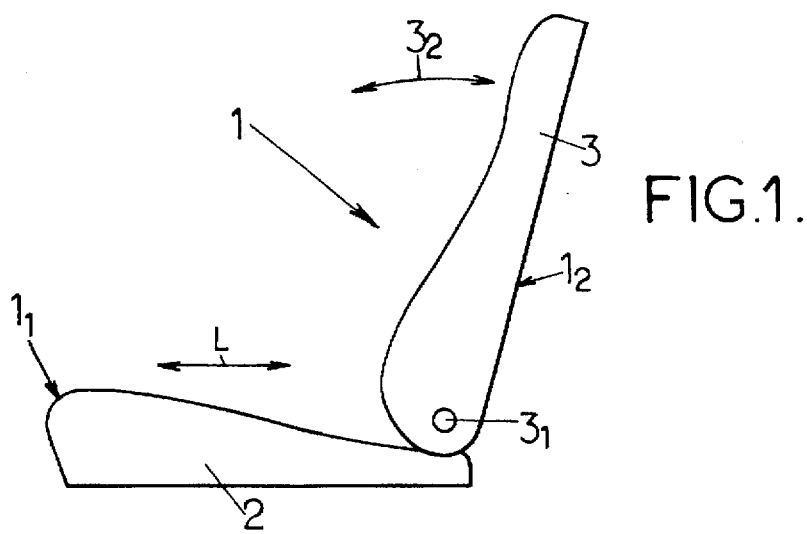
FIG. 1 is a diagrammatic elevation of a seat which can be equipped with the adjusting device according to the invention.

As represented diagrammatically in FIG. 1, the invention applies to a vehicle seat 1, especially a front seat for a two- or three-door vehicle, that is to say for a vehicle in which it is necessary to tip up at least one of the front seats in order to gain access to the rear seats.

The seat 1 includes a seat part 2 which defines a front part $1_1$ of the seat and a backrest 3 which defines a rear part $1_2$ of the seat. The seat part 2 can be displaced in terms of translation relative to a base including longitudinal rails 22, in a longitudinal direction L towards the front and towards the back of the seat.

The backrest 3 is mounted on the seat part 2 so that it can pivot about a spindle $3_1$ as represented by the double-headed arrow $3_2$ in FIG. 1, between a folded-down forwards position and an upright position in which a user can sit down on the seat, which corresponds to the driving position for the driver. Preferably, the upright position of the backrest is adjustable in terms of inclination.

Figure 2:
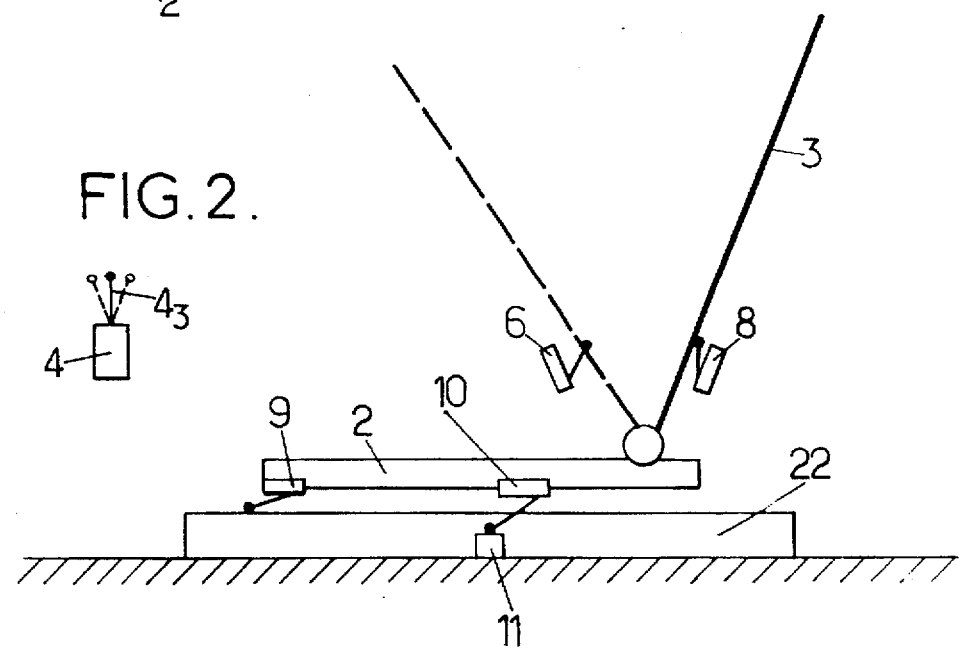
FIG. 2 is an operating diagram of one embodiment of the positioning device according to the invention.
Figure 3:
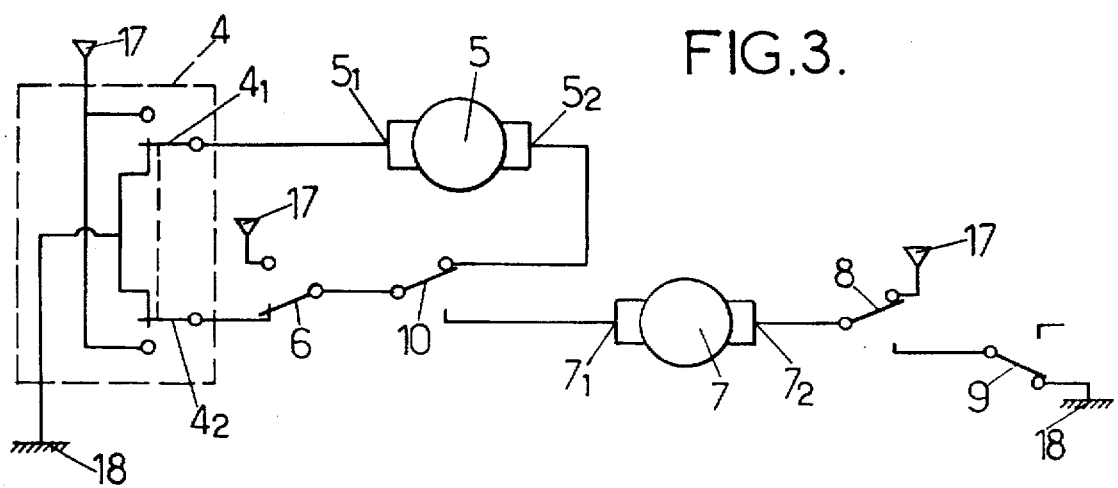
FIG. 3 is an electrical diagram of the device of FIG. 2.

FIGS. 2 and 3 diagrammatically represent one embodiment of a longitudinal positioning device according to the present invention, which allows the seat part 2 of the seat of FIG. 1 to be positioned longitudinally.

As represented in FIG. 3, this device includes two DC electric motors, namely an adjustment electric motor 5 which can longitudinally displace the seat part at a slow speed, and an automatic-displacement electric motor 7 which can longitudinally displace the seat part at high speed.

The mechanical links between motors 5 and 7 and, on the one hand, the base and, on the other hand, the seat part, are conventional and will not be described here.

The adjustment motor 5 is connected between two terminals 17 and 18 of a DC source, particularly a battery. In general, the terminal 17 is the positive terminal of the battery and the terminal 18 is the negative terminal of the battery, this terminal 18 being linked to the vehicle earth. These arrangements are not, however, obligatory, and although less preferable, it might be conceivable for the terminal 18 not to be linked to the vehicle earth and/or for the terminal 17 to represent the negative pole of the battery and the terminal 18 to represent its positive pole.

The adjustment electric motor 5 includes two terminals $5_1$, $5_2$. The first terminal $5_1$ is connected to a first operating switch $4_1$, whereas the second terminal $5_2$ is connected to a second operating switch $4_2$ via the switches 6 and 10.

The two operating switches $4_1$ and $4_2$ are, in the example represented, mechanically linked to one another and incorporated into one and the same control box 4.

The control box 4 may include a single push-button $4_3$ (FIG. 2) which simultaneously operates the two operating switches $4_1$, $4_2$ and which can be displaced between three positions, namely a position of rest, a forwards operating position and a backwards operating position. Switches in a position of arrest are equivalent to switches in an open electrical circuit state and switches in an operating position are equivalent to closed switches establishing electrical contact in an electrical circuit.

When the push-button $4_3$ is in its position of rest, each of the operating switches $4_1$, $4_2$ is in a state of rest, and connects the terminal of the electric adjustment motor to which it is linked to the second terminal 18 of the battery. Thus, in this position, the electric adjustment motor 5 does not operate.

When the push-button $4_3$ is in its backwards operating position, the first operating switch $4_1$ is placed in an operating state and connects the terminal $5_1$ of the motor to the first terminal 17 of the battery, whereas the second switch $4_2$, despite a displacement, remains in its state of rest and continues to connect the second terminal $5_2$ of the electric adjustment motor to the second terminal 18 of the battery. As a consequence, the electric adjustment motor 5 is switched on and rotates in a predetermined direction in order to move the seat part 2 of the seat back relative to the base 22. When the user releases the push-button $4_3$, this push-button returns elastically to its position of rest, so that the two operating switches $4_1$ and $4_2$ are also brought back to their position of rest, which stops the electric adjustment motor 5.

Likewise, when the push-button $4_3$ is placed in its forwards operating position, the second operating switch $4_2$ is placed in an operating state, in which it connects the second terminal $5_2$ of the electric adjustment motor to the first terminal 17 of the battery, whereas the first operating switch $4_1$ remains in the state of rest despite its displacement, so that the first terminal $5_1$ of the electric adjustment motor remains connected via the first operating switch $4_1$ to the second terminal 18 of the battery. Thus, the electric adjustment motor rotates in the opposite direction relative to the previous case, so as to entrain the seat part of the seat forwards. As before, when the user releases the push-button $4_3$ the two operating switches $4_1$ and $4_2$ return to their position of rest, so that the electric adjustment motor 5 is stopped.

The two operating switches $4_1$ and $4_2$ could possibly not be mechanically linked to one another and could then be operated independently of one another, each by a push-button with two positions: a position of rest in which the operating switch connects the terminal of the motor to which it is linked to the second terminal 18 of the battery, and an operating position in which the operating switch connects the terminal of the motor 5 to which it is linked to the first terminal 17 of the battery.

According to the invention, the seat-positioning device further includes a folded-down-position switch 6, an upright-position switch 8, an end-of-travel switch 9 and a stop switch 10.

The folded-down-position switch 6 and the stop switch 10 are connected in series between the second operating switch $4_2$ and the second terminal $5_2$ of the electric adjustment motor 5, the folded-down-position switch 6 being located between the stop switch 10 and the operating switch $4_2$. The switches 6 and 10 could possibly be connected in series between the first operating switch $4_1$ and the first terminal $5_1$ of the motor 5.

The folded-down-position switch 6 may be placed either in a state of rest, in which it connects the stop switch 10 to the second operating switch $4_2$, or in an operating state in which it connects the said stop switch 10 to the first terminal 17 of the battery. The folded-down-position switch interacts with the backrest 3 of the seat in order to be placed in its operating state when the backrest 3 is in its folded-down position, and in its state of rest when the backrest is not in its folded-down position.

The stop switch 10 may be placed either in an operating state, in which it connects the folded-down-position switch 6 to the second terminal $5_2$ of the electric adjustment motor 5, or in a state of rest in which it connects the folded-down-position switch 6 to a first terminal $7_1$ of the automatic-displacement electric motor 7.

Through means which will be described later, the stop switch 10 is always placed in its state of rest when the backrest 3 of the seat is in its folded-down position. When this backrest is in its upright position, the stop switch 10 interacts with a slider 11 which can move in terms of translation relative to the base in the longitudinal direction L so as to be placed in its operating state when the seat part and the slider are in a predetermined relative position, known as the locking position, and so as to be placed in its state of rest when the seat part and the slider are not in their relative position known as the locking position.

The automatic-displacement electric motor 7 includes a second terminal $7_2$ which is connected to the upright-position switch 8. The switch 8 may be placed either in an operating state, in which it connects the said second terminal $7_2$ to the first terminal 17 of the battery, or in a state of rest in which it connects the said second terminal $7_2$ to the second terminal 18 of the battery, via the end-of-travel switching 9.

The upright-position switch 8 interacts with the backrest 3 of the seat in a way which will be described later, so as to be placed in its operating state when the backrest is in its upright position, and in its state of rest when the backrest is not in its upright position.

In contrast, the end-of-travel switch 9 is in general closed, except when the seat part 2 of the seat is moved forwards as far as it will go relative to the base, into a predetermined position known as the end-of-travel position, in which case the end-of-travel switch 9 is open.

The device operates as follows. When the backrest 3 is in the upright position, the electrical circuit is in the situation represented in FIG. 3, and the switches 6 and 10 connect the second terminal $5_2$ of the electric adjustment motor to the second operating switch $4_2$. In this case, the position of the seat part of the seat can be adjusted into a chosen position, by actuating the push-button $4_3$ as described before.

During this movement, the slider 11 is secured to the seat part 2 by means which will be described later, in the relative position known as the locking position of the slider relative to the seat. The slider 11 is therefore displaced together with the seat part.

When a user tips the backrest 3 of the seat into its folded-down position, the upright-position switch 8 changes to the state of rest, then the stop switch 10 changes to the state of rest, and finally the folded-down-position switch 6 changes into the operating state. As a consequence, the first terminal $7_1$ of the automatic-displacement electric motor 7 is connected to the first terminal 17 of the battery via the folded-down-position switch 6 and the stop switch 10, and the second terminal $7_2$ of the automatic-displacement electric motor is connected to the second terminal 18 of the battery via the upright-position switch 8 and the end-of-travel circuit breaker 9. Thus, the automatic-displacement electric motor 7 is set into operation in a direction which allows the seat part 2 to be moved forward rapidly relative to the base.

When the seat part reaches its end-of-travel position, the end-of-travel switch 9 opens so that the automatic-displacement electric motor stops.

When the seat is in this end-of-travel position with its backrest folded down, it is easy for a user to gain access to the rear of the seat, for example in order to sit in the back of the vehicle.

Starting from this position, when the user puts the back-rest 3 back in its upright position, the folded-down-position switch 6 returns to the state of rest, the upright-position switch 8 returns to the operating state, and the stop switch 10 is still in the state of rest. Also, at this point in time the push-button $4_3$ is normally in its position of rest.

As a consequence, the first terminal $7_1$ of the automatic-displacement electric motor is connected to the second terminal 18 of the battery via the stop switch 10, the folded-down-position switch 6 and the second operating switch $4_2$, whereas the second terminal $7_2$ of the automatic-displacement electric motor is connected to the first terminal 17 of the battery via the upright-position switch 8. Thus, the automatic-displacement electric motor 7 is set into operation in the opposite direction from the previous case, that is to say so as to displace the seat part 2 backwards relative to the base.

When the seat part 2 reaches its chosen position, that is to say the position which was set beforehand by the user, the stop switch 10 returns to its operating state, so that the automatic-displacement electric motor 7 is stopped. At this point, the slider and the seat part are in their relative so-called locking position, so that the slider is again secured to the seat part.

Figure 4:
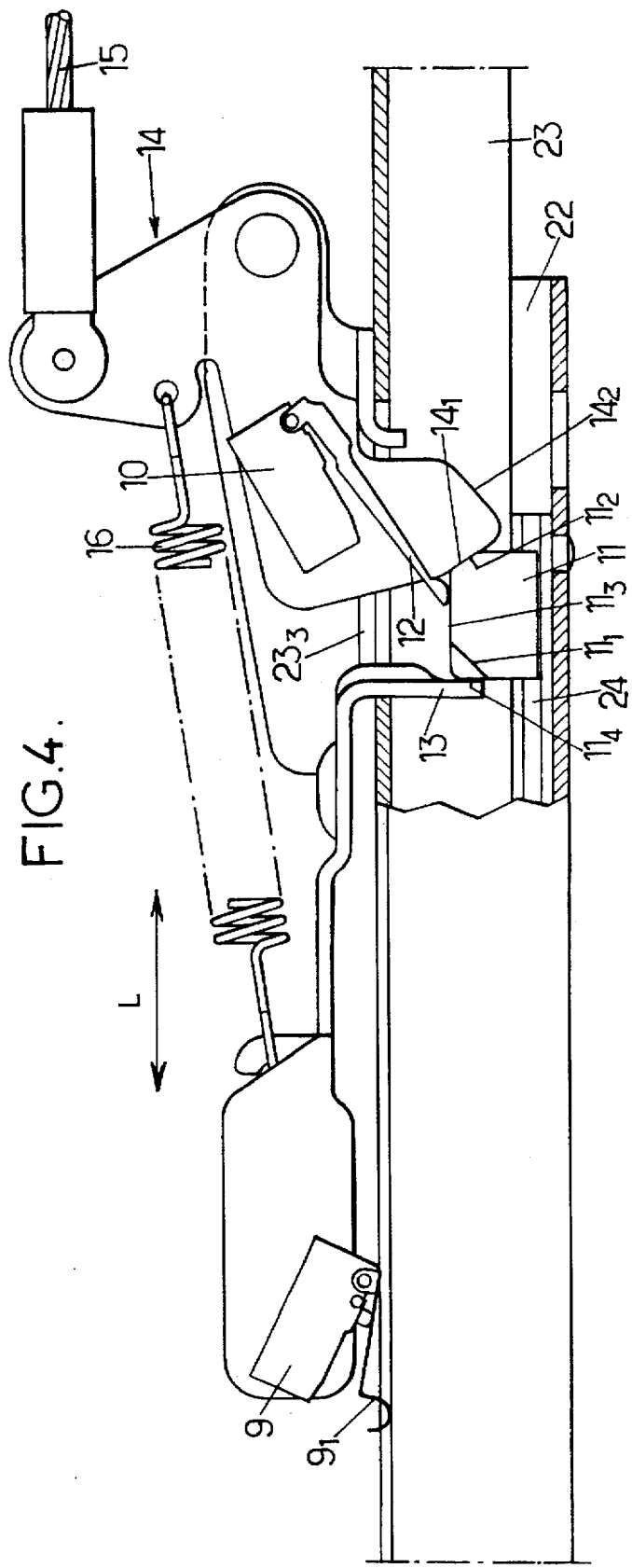
FIG. 4 is a partial section of part of the positioning device of FIG. 2, when the backrest of the seat is upright in the position of use.
Figure 5:
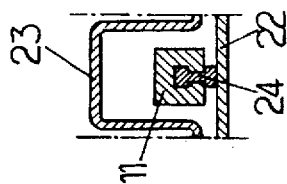
FIG. 5 is a diagrammatic section of the slider of FIG. 4 on its guide rail inside one of the seat part slide-rails.

A particularly advantageous embodiment of the invention is described in FIGS. 4 to 8. In this embodiment, as represented in FIG. 5, the seat part is mounted on longitudinal slide-rails consisting, on the one hand, of lower rails 22 which form the base and, on the other hand, of upper rails 23 which are secured to the seat part 2.

Furthermore, a rail 24 is fixed to the base of the lower rail 22 of one of the slide-rails and inside this slide-rail. The slider 11 is mounted so it can slide with friction along this rail 24 and it lies entirely within the slide-rail.

As represented in FIG. 4, the upper rail 23 of the slide-rail which includes the slider 11 includes the stop switch 10 and the end-of-travel switch 9 described previously, as well as a locking mechanism which makes it possible to secure the slider 11 relative to the seat part of the seat.

This locking mechanism includes a locking member 14 which is mounted so it can pivot about a horizontal spindle perpendicular to the longitudinal direction L. This locking member 14 may thus be displaced by rotation between a position known as an engagement position and a position known as a non-obstructing position.

In the position known as the engagement position, part of the locking member 14 penetrates inside the slide-rail via an opening $23_3$ made in the upper rail 23, so that the locking member 14 interferes with the slider 11. In the non-obstructing position, in contrast, the locking lever 14 is raised sufficiently not to interfere with the slider 11.

The locking member 14 is elastically urged into its engagement position by a spring 16 and it is furthermore linked to one end of a cable 15, the other end of which is secured to the framework of the backrest 3 of the seat. This cable 15 may be tensioned and act on the said locking member 14 in order to place it in its non-obstructing position when the backrest 3 is placed in its folded-down position, as explained later.

Figure 6:
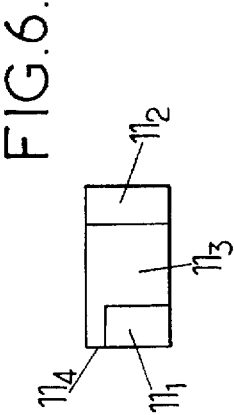
FIG. 6 is a plan view of the slider of FIG. 4.

As represented in FIGS. 4 and 6, the slider 11 has a profile which comprises a horizontal upper face $11_3$ surrounded by two inclined ramps $11_1$, $11_2$ respectively towards the front and towards the back. However, the ramp $11_1$ pointing forwards does not represent the entire width of the slider, part of the width of the slider consisting, towards the front of this slider, of a vertical face $11_4$.

When the slider and the seat part are in their relative locking position and the locking member in its engaged position, as represented in FIG. 4, the slider 11 is trapped between, on the one hand, a limit stop finger 13 which is secured to the upper rail 23 and, on the other hand, a stopping face $14_1$ of the locking member 14. In this position, the limit stop finger 13 which projects vertically into the slide-rail via the abovementioned opening $23_3$ is located towards the front of the slider 11 and abuts against the vertical face $11_4$ of the slider. This vertical face $11_4$ could possibly be eliminated, the entire width of the slider 11 then being occupied by the ramp $11_1$, and the limit stop finger 13 abutting against some other part of the slider 11, for example the ramp $11_1$.

Also, in this same locking position, the stopping face $14_1$ of the locking member abuts against the rear ramp $11_2$ of the slider, and the said stopping face $14_1$ is sufficiently slightly inclined relative to the vertical for this abutment not to tend to lift the locking member 14 when the said locking member entrains the slider 11 during a seat-part adjustment movement.

The stop switch 10, as well as a detection lever 12 which can rotate parallel to the locking member between a position known as a detection position and a position known as a position of rest is mounted on the locking lever 14, the detection lever 12 being urged elastically towards its position of rest.

The detection lever 12 interacts with the stop switch 10 in order to place the stop switch in its state of rest when the said detection lever is in its position of rest and in order to place the stop switch in its operating state when the said detection lever is in its detection position.

The detection lever extends forwards as far as a free end which is designed to interfere with the slider 11 and which bears on the upper face $11_3$ of the slider when the locking member 14 is in its engagement position and the slider 11 trapped between the limit stop 13 and the locking member 14. Thus, in this position, the detection lever 12 is in its detection position and the stop switch 10 is in its operating state.

Also, the end-of-travel switch 9 is also fixed to the upper rail 23 of the slide-rail. This switch is operated by a rotary lever $9_1$ extending forwards as far as a free end which slides over a portion of the lower rail 22. The lever $9_1$ is urged elastically so that its free end is applied against the said lower rail 22, and it operates the switch 9 so that the latter is closed as long as the free end of the said lever is sliding over the said lower rail.

When a user tips the backrest 3 of the seat into the folded-down position, the cable 15 is tensioned and causes the locking member 14 to pivot into its non-obstructing position, as represented in FIG. 7. As explained before, the automatic-displacement electric motor 7 then displaces the seat part 2 forwards. Owing to the fact that the locking member 14 is in its non-obstructing position, the slider 11 is not entrained with the seat part during this movement.

When the free end of the lever $9_1$ of the end-of-travel switch reaches the front end of the lower rail 22, this free end can be displaced downwards since it no longer bears against the lower rail. This pivoting movement of the lever $9_1$ causes the end-of-travel switch 9 to open, which stops the automatic-displacement electric motor 7.

Starting from this end-of-travel position, when the user returns the backrest 3 of the seat to the upright position, the seat part of the seat is again entrained backwards, as explained before, and the locking member 14 is put back in its engagement position.

The locking member 14 includes, towards the rear, a cam surface $14_2$ which slides over the front ramp $11_1$ of the slider 11 at the end of the backward movement of the seat part, which causes that part of the locking member 14 which projects inside the upper rail 23 to be lifted, against the force of the spring 16.

That part of the locking member 14 which projects inside the slide-rail then slides over the upper face $11_3$ of the slider, and then the locking member 14 resumes its engagement position, under the action of the spring 16, when the seat part and the slider are in their relative position known as the locking position. The detection lever 12 then bears on the upper face $11_3$ of the slider, which places the said detection lever in its position known as the detection position, so that the stop switch 10 is then placed in its operating state and stops the automatic-displacement motor 7.

The cam surface $14_2$ and the ramp $11_1$ are sufficiently inclined relative to the vertical and the friction between the slider 11 and the rail 24 is sufficiently high for the slider 12 not to be displaced when the locking member 14 is lifted.

It might be possible, although this is not preferred, to eliminate either the front ramp $11_1$ of the slider, or the cam surface $14_2$ of the locking member, and it might also be possible to hold the slider 11 in place using locking means, especially electromagnetic ones, for as long as the stop switch 10 is in its position of rest.

As represented in FIG. 8, in the particular embodiment described here, the device according to the invention further includes a rotary cam 20 which is centred on the rotation spindle $3_1$ of the backrest and which is secured to the framework of this backrest by means of a fastener 25. Moreover, the rotary cam 20 includes an arm 21 which is fixed to one end of the cable 15, in order to pull on this cable and thus place the locking member 14 in the non-obstructing position when the backrest is placed in the folded-down position.

The rotary cam 20 includes a circular arc-shaped profile $20_1$ which extends over a certain angle $\alpha$ and which is centred on the rotation spindle $3_1$. In addition, the rotary cam 20 also includes a projecting part $20_2$, which projects radially outwards and which is separated from the circular arc-shaped profile $20_1$ by two regions of smaller radius.

This rotary cam 20 interacts with the folded-down-position switch 6 and upright-position switch 8 which are mounted on a support 19 secured to the seat part 2 of the seat. Each of the switches 6 and 8 includes an actuating member $6_1$, $8_1$ respectively which is elastically urged radially towards the rotation spindle $3_1$, these actuating members being designed to place their respective switch in the state of rest when they are themselves in a position of rest in which they project radially towards the rotation spindle $3_1$ to the maximum extent, and into the operating state when they are displaced radially outwards.

When the backrest of the seat is in its upright position, the circular profile $20_1$ of the rotary cam bears on the actuating member $8_1$ of the upright-position switch, whereas the actuating member $6_1$ of the folded-down position switch finds itself in its position of rest. The upright-position switch 8 is therefore in the operating state, whereas the folded-down-position switch 6 is in the state of rest. Owing to the fact that the circular arc-shaped profile $20_1$ extends over a certain angle $\alpha$, it is possible to adjust the inclination of the seat in an angular range of amplitude $\alpha$, whilst ensuring that the upright-position switch 8 actually is in the active state when the backrest of the seat is in its upright position.

When the backrest of the seat is in its folded-down position, the actuating member $8_1$ no longer bears against the circular arc-shaped profile $20_1$, so that it returns to its position of rest, and the projecting part $20_2$ of the rotary cam is in the position represented in dotted line in FIG. 8 and comes to bear on the actuating member $6_1$ of the folded-down-position switch. As a consequence, the upright-position switch 8 is then in the state of rest, whereas the folded-down-position switch 6 is in the operating state.

We claim:

1. A vehicle seat comprising:
    a seat part mounted on a base so that said seat part can move forward and backward in a longitudinal direction,
    a backrest mounted on the seat part and able to pivot between a folded-down forward position and an upright position in which a user can sit down on the seat,
    adjustment means for enabling said user to displace the seat part longitudinally to a position chosen by said user along said base,
    an automatic displacement motor for automatically displacing the seat part forward as far as an end-of-travel position when the backrest is in said folded-down position, and for automatically displacing the seat part backward as far as said chosen position when the backrest is returned from said folded-down position to said upright position,
    a slider which can move longitudinally relative to the base,
    an abutment secured to the seat part,
    a locking member able to pivot on the seat part between an engagement position where said locking member can interfere with said slider and a non-obstructing position where said locking member does not interfere with said slider, said locking member being urged by a spring toward said engagement position and being displacable into said non-obstructing position by neutralizing means actuated by the backrest when said backrest is placed in said folded-down position, said locking member including an operative face pointing forward, the slider being locked relative to the seat part between the abutment and said operative face when said slider and said seat part are in a relative locking position when the locking member is in said engagement position and the backrest is in said upright position, the slider and the locking member respectively including surfaces designed to interact with each other in order to displace the locking member toward said non-obstructing position through a cam effect, without displacing the slider, when the seat part is being displaced automatically backward, so that the seat part and the slider can come back into the locking position relative to the slider,
    a sensor mounted on said seat part for sensing the slider when said slider is in the locking position relative to the seat part,
    and means for stopping the action of the automatic displacement motor when said locking position is detected by the sensor and when the backrest is in said upright position.

2. The vehicle seat as claimed in claim 1, wherein the neutralizing means include a cable mounted between the locking member and the backrest of the seat, and tensioned when the backrest is in said folded-down position, in order to cause the locking member to pivot into said non-obstructing position.

3. The vehicle seat as claimed in claim 1, wherein the automatic displacement motor is electrically powered by electrical power supply means and the stopping means comprises a stop switch mounted in series with said motor, the sensor including a detection lever which operates the stop switch and which pivots on the locking member, said detection lever being movable between a position of rest in which the stop switch allows the automatic displacement motor to be powered and a detection position in which said stop switch cuts off the power of said automatic displacement motor, the detection lever being urged elastically towards said position of rest, said detection lever being movable into said detection position by the slider when the slider and the seat part are in said relative locking position and the locking member is in said engaged position, and the detection lever no longer contacts the slider when the locking member is in said non-obstructing position, so that said detection lever is then in said position of rest.

4. The vehicle seat as claimed in claim 3, further including a folded-down position switch and an upright-position switch, the automatic displacement motor and the stop switch being connected in series between the folded-down-position switch and the upright-position switch, and wherein said folded-down-position and upright-position switches interact with the backrest of the seat in order to connect the automatic displacement motor to said electrical power supply means, reversing a direction of rotation of said motor depending on whether the backrest is in said folded-down position or in said upright position.

5. The vehicle seat as claimed in claim 4, wherein the electrical power supply means includes a first terminal linked to the upright-position switch when the backrest is in the upright position, a second terminal linked to the upright-position switch by an end-of-travel switch when the backrest is in the folded-down position, said end-of-travel switch being open when the seat part of the seat is forward in said end-of-travel position, and closed when the seat part of the seat is not in said end-of-travel position.

6. The vehicle seat as claimed in claim 4, wherein the backrest of the seat is mounted so as to rotate about a rotation axis, and wherein the seat further includes a rotary cam secured to the backrest and having a circular arc centered on said rotation axis and extending over an angle sufficient to allow for a range of angular adjustment of the upright position of the backrest, the upright-position switch including an operating member displaced elastically by the cam member when the backrest is in said upright position, and which contacts the circular arc of said cam member, the member for operating the upright-position switch being in contact with said circular arc in the upright position of the backrest throughout said adjustment range.

* * * * *